United States Patent [19]

Allard et al.

[11] Patent Number: 5,432,946
[45] Date of Patent: Jul. 11, 1995

[54] LAN SERVER PERSONAL COMPUTER WITH UNATTENDED ACTIVATION CAPABILITY

[75] Inventors: David J. Allard, Boynton Beach; Pramod Chandra, Delray Beach, both of Fla.

[73] Assignee: International Business Machines Corp., Armonk, N.Y.

[21] Appl. No.: 684,526

[22] Filed: Apr. 11, 1991

[51] Int. Cl.⁶ .................................. G06F 1/32
[52] U.S. Cl. ....................... 395/750; 395/800; 364/700; 364/707; 364/927.96; 364/931; 364/940.62; 364/948.4; 364/DIG. 2
[58] Field of Search ............. 395/750, 500, 375, 800, 395/200, 575; 364/700, 704, 705, 05, 705.06, 706, 707

[56] References Cited

U.S. PATENT DOCUMENTS

| | | | |
|---|---|---|---|
| 4,698,748 | 10/1987 | Juzswik et al. | 395/750 |
| 4,747,041 | 5/1988 | Engel et al. | 395/750 |
| 4,878,196 | 10/1989 | Rose | 395/750 |
| 4,980,836 | 12/1990 | Carter et al. | 364/483 |
| 5,022,077 | 6/1991 | Bealkowski et al. | 380/4 |
| 5,167,024 | 11/1992 | Smith et al. | 395/375 |
| 5,193,174 | 3/1993 | Bealkowski et al. | 395/500 |
| 5,218,704 | 6/1993 | Watts, Jr. et al. | 395/750 |

Primary Examiner—Alyssa H. Bowler
Assistant Examiner—Alpesh M. Shak
Attorney, Agent, or Firm—Anthony N. Magistrale

[57] ABSTRACT

This invention relates to personal computers used as network servers, and more particularly to unattended activation and operation of such personal computers through cooperation of power supplies for supplying electrical power to electrically operated components which manipulate or store digital data with a controlling network option card added to the personal computer in adapting it to the network environment. In accordance with this invention, a system administrator is relieved of any necessity of leaving equipment in the power-on active state in order to have network resources available to client users.

8 Claims, 5 Drawing Sheets

LAN SERVER PERSONAL COMPUTER WITH UNATTENDED ACTIVATION CAPABILITY

FIELD AND BACKGROUND OF INVENTION

This invention relates to personal computers used as local area network (LAN) servers, and more particularly to unattended activation and operation of such personal computers through cooperation of power supplies for supplying electrical power to electrically operated components which manipulate or store digital data with options added to the personal computer in adapting the personal computer to the LAN server function.

Personal computer systems in general and IBM personal computers in particular have attained widespread use for providing computing capability to many segments of today's modern society. Personal computer systems can usually be defined as a desk top, floor standing, or portable microcomputer that consists of a system unit having a single system processor and associated volatile and non-volatile memory, a display monitor, a keyboard, one or more diskette drives, a fixed disk storage, and an optional printer. One of the distinguishing characteristics of these systems is the use of a motherboard or system planar to electrically connect these components together. These systems are designed primarily to give independent computing capability to a single user and are inexpensively priced for purchase by individuals or small businesses. Examples of such personal computer systems are IBM's PERSONAL COMPUTER AT and IBM's PERSONAL SYSTEM/2 Models 25, 30, L40SX, 50, 55, 60, 65, 70, 80, 90 and 95.

Persons familiar with the operation and use of these systems will also be familiar with their use in what are known as local area networks, in which a number of personal computers are connected together for sharing of files and other resources. Certain forms of such networks are known as "client-server" computing environments, in that one or more particularly powerful systems ("servers"), potentially having greatly enlarged file storage capability, are connected with less powerful systems ("clients", sometimes known as LAN stations).

These systems can be classified into two general families. The first family, usually referred to as Family I Models, use a bus architecture exemplified by the IBM PERSONAL COMPUTER AT and other "IBM compatible" machines. The second family, referred to as Family II Models, use IBM's MICRO CHANNEL bus architecture exemplified by IBM's PERSONAL SYSTEM/2 Models 50 through 95. The Family I models typically have used the popular INTEL 8088 or 8086 microprocessor as the system processor. These processors have the ability to address one megabyte of memory. The Family II models typically use the high speed INTEL 80286, 80386, and 80486 microprocessors which can operate in a real mode to emulate the slower speed INTEL 8086 microprocessor or a protected mode which extends the addressing range from 1 megabyte to 4 Gigabytes for some models. In essence, the real mode feature of the 80286, 80386, and 80486 processors provide hardware compatibility with software written for the 8086 and 8088 microprocessors.

Electrical power for energizing the components of such personal computers is conventionally supplied by power supplies which use control logic, switching transistors, power transformers, rectifiers and filters to convert electrical power from an available line voltage and current, such as the 110 volt 60 hertz current supplied in the United States, to the direct voltages and currents required for operation of the personal computer. It has been conventional to control operation of such power supplies by switching the supply voltage to the power supply. In the example given, such switching is accomplished by turning on and off the 110 volt 60 hertz mains supply current.

It has been proposed heretofore, as in Summerlin U.S. Pat. No. 4,723,269, to use a lower level voltage to control the operation of a personal computer power supply. In the Summerlin disclosure, to which the interested reader is referred, a telephone ring detector acts through optically coupled semiconductor devices to control passage of the relatively high voltage supply current. However, such circuitry continues to require manual control over computer power to be exercised by manipulation of a relatively high voltage switch.

A co-pending application owned in common with the present subject invention (Ser. No. 536,751 filed 14 Jun. 1990 and now issued as U.S. Pat. No. 5,008,829) discloses and protects an arrangement in which a user of a personal computer is protected against unnecessary exposure to the relatively high voltage of sources of supply to the personal computer by using logic level voltage, low current electrical signals to enable control over the operation of a personal computer. As recognized there, such use of logic level signals opens the possibility of establishing control over the supply of electrical power to the operating components of a computer in a manner consistent with the manual control used by an operator.

This latter possibility becomes of importance in a client-server computing environment in that resources available only from or through the server will become unavailable to a client when the server is dormant, deactivated or powered-down. As one particular example, an operator seeking to use a particular network outside normal network availability hours would be restricted to resources (programs, files, printers/plotters, etc.) available solely at the individual workstation or client were the network server turned off as is often done for security reasons or to reduce running time and consequent need for service. While a server could conceivably be located and turned on, such systems are often located in places which are either inaccessible or unknown to an individual operator.

BRIEF DESCRIPTION OF THE INVENTION

With the foregoing in mind, it is an object of this invention to enable a client personal computer system to activate a server system as may be required in order to gain access to network resources under the control of the server. In realizing this object of the present invention, the maintenance and power consumption reduction advantages of turning off the server during periods of inactivity (such as normal network unavailability on a weekend, for example) are retained while opening the possibility of accessing network resources if needed during such an interval.

A further object of this invention is to operate a network in such a manner that a client system may, by inquiry of its associated server, cause the server to awake from dormancy, acknowledge the client, and make network resources available. In realizing this object, the server functions in accordance with a method in which a call from a client is recognized by the dormant server, the server is activated and responds to the requests from the client, and the server is later again deactivated.

BRIEF DESCRIPTION OF THE DRAWINGS

Some of the objects of the invention having been stated, other objects will appear as the description proceeds, when taken in connection with the accompanying drawings, in which.

DETAILED DESCRIPTION OF INVENTION

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Figure 1:
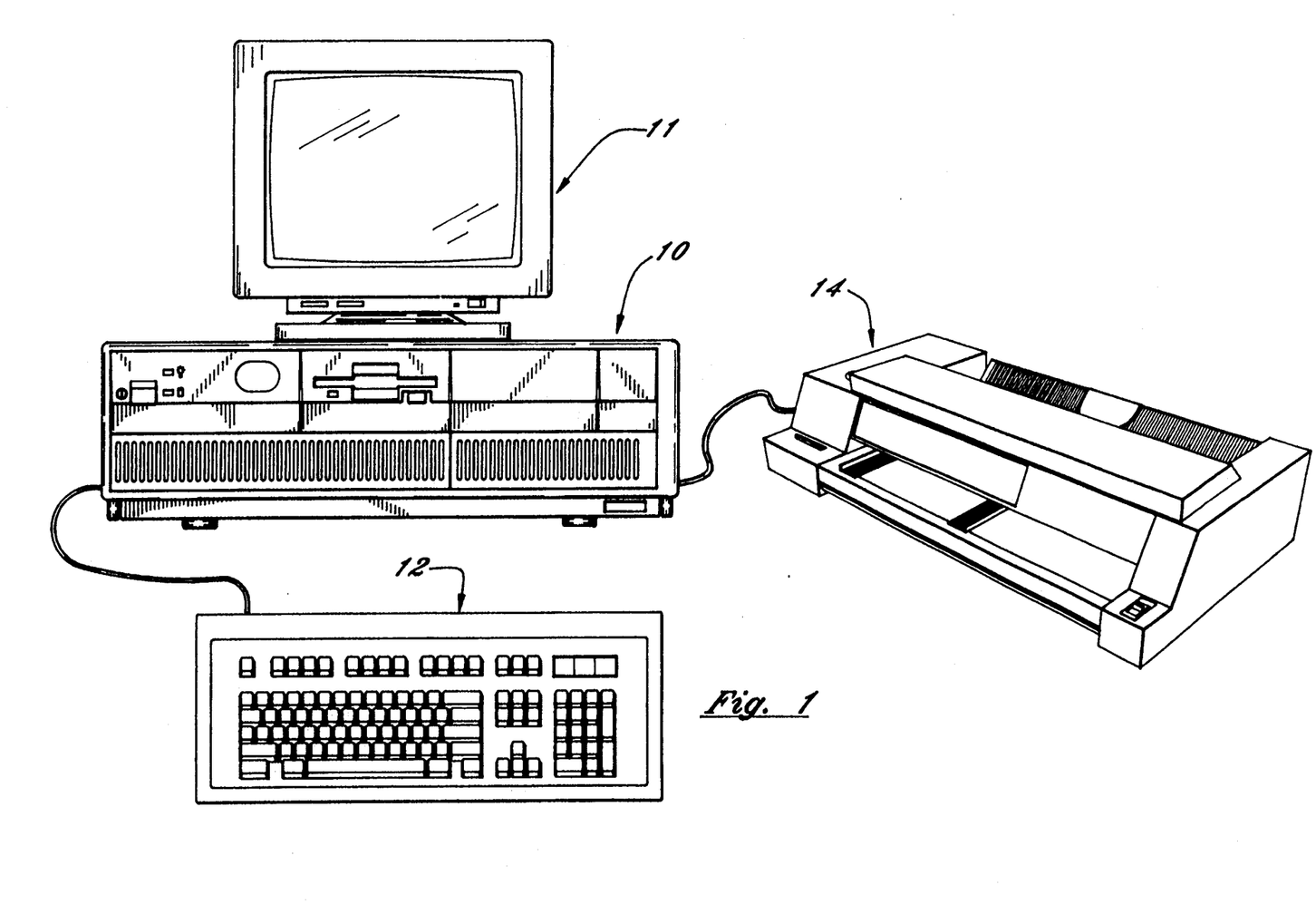
FIG. 1 is a perspective view of a personal computer embodying this invention.

Referring now more particularly to the accompanying drawings, a microcomputer embodying the present invention is there shown and generally indicated at 10 (FIG. 1). As mentioned hereinabove, the computer 10 may have an associated monitor 11, keyboard 12 and printer or plotter 14. The computer 10 has a cover 15 formed by a decorative outer member 16 (FIG. 2) and an inner shield member 18 which cooperate with a chassis 19 in defining an enclosed, shielded volume for receiving electrically powered data processing and storage components for processing and storing digital data. At least certain of these components are mounted on a planar 20 which is mounted on the chassis 19 and provides a means for electrically interconnecting the components of the computer 10 including those identified above and such other associated elements as floppy disk drives, various forms of direct access storage devices, accessory cards or boards, and the like.

Figure 2:
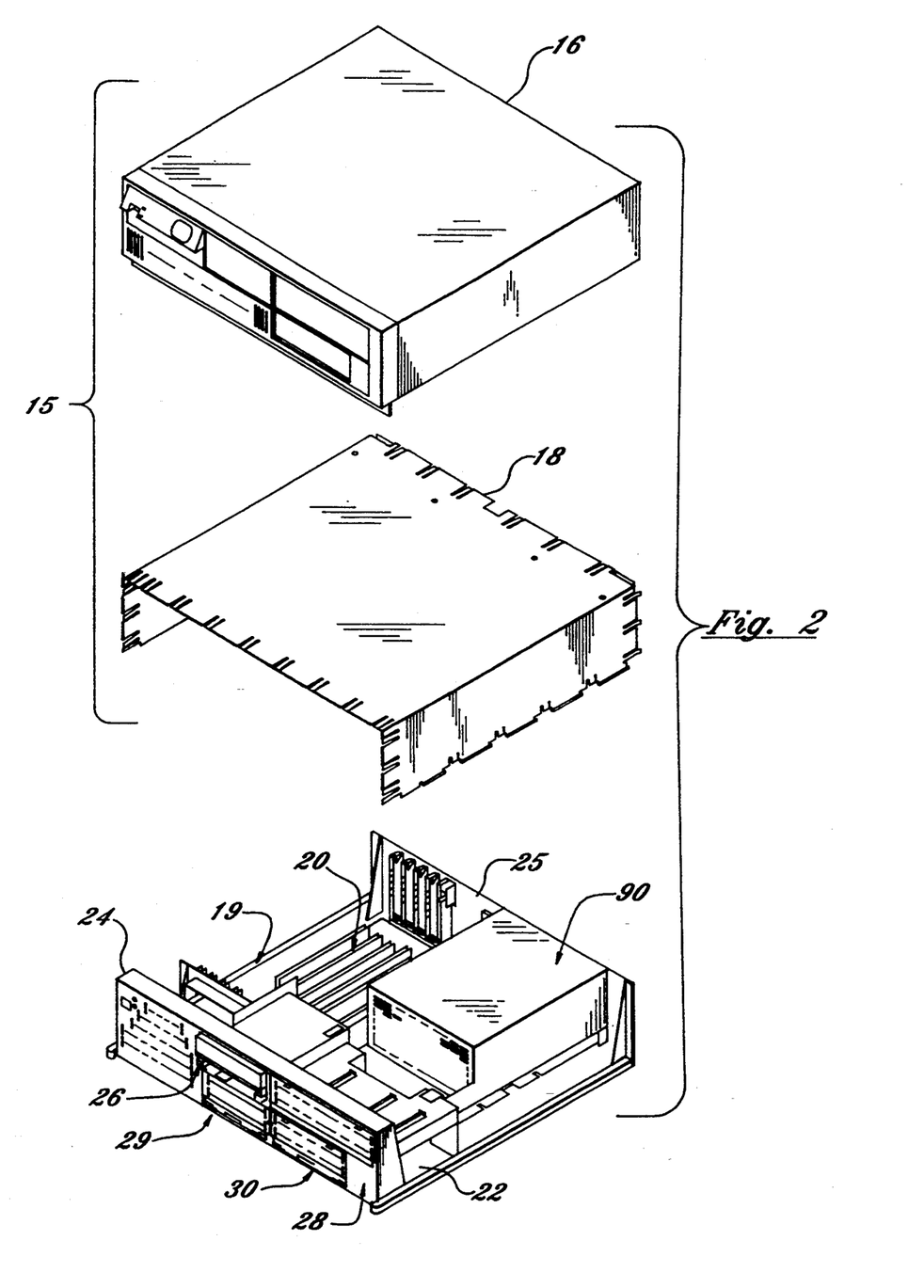
FIG. 2 is an exploded perspective view of certain elements of the personal computer of FIG. 1 including a chassis, a cover, an electromechanical direct access storage device and a planar board and illustrating certain relationship among those elements.

The chassis 19 has a base indicated at 22, a front panel indicated at 24, and a rear panel indicated at 25 (FIG. 2). The front panel 24 defines at least one open bay (and in the form illustrated, four bays) for receiving a data storage device such as a disk drive for magnetic or optical disks, a tape backup drive, or the like. In the illustrated form, a pair of upper bays 26, 28 and a pair of lower bays 29, 30 are provided. The upper bays 26, 28 are adapted to receive peripheral drives of a first size (such as those known as 5.25 inch drives) while the lower bays are adapted to receive devices of another size (such as those known as 3.5 inch drives).

Figure 3:
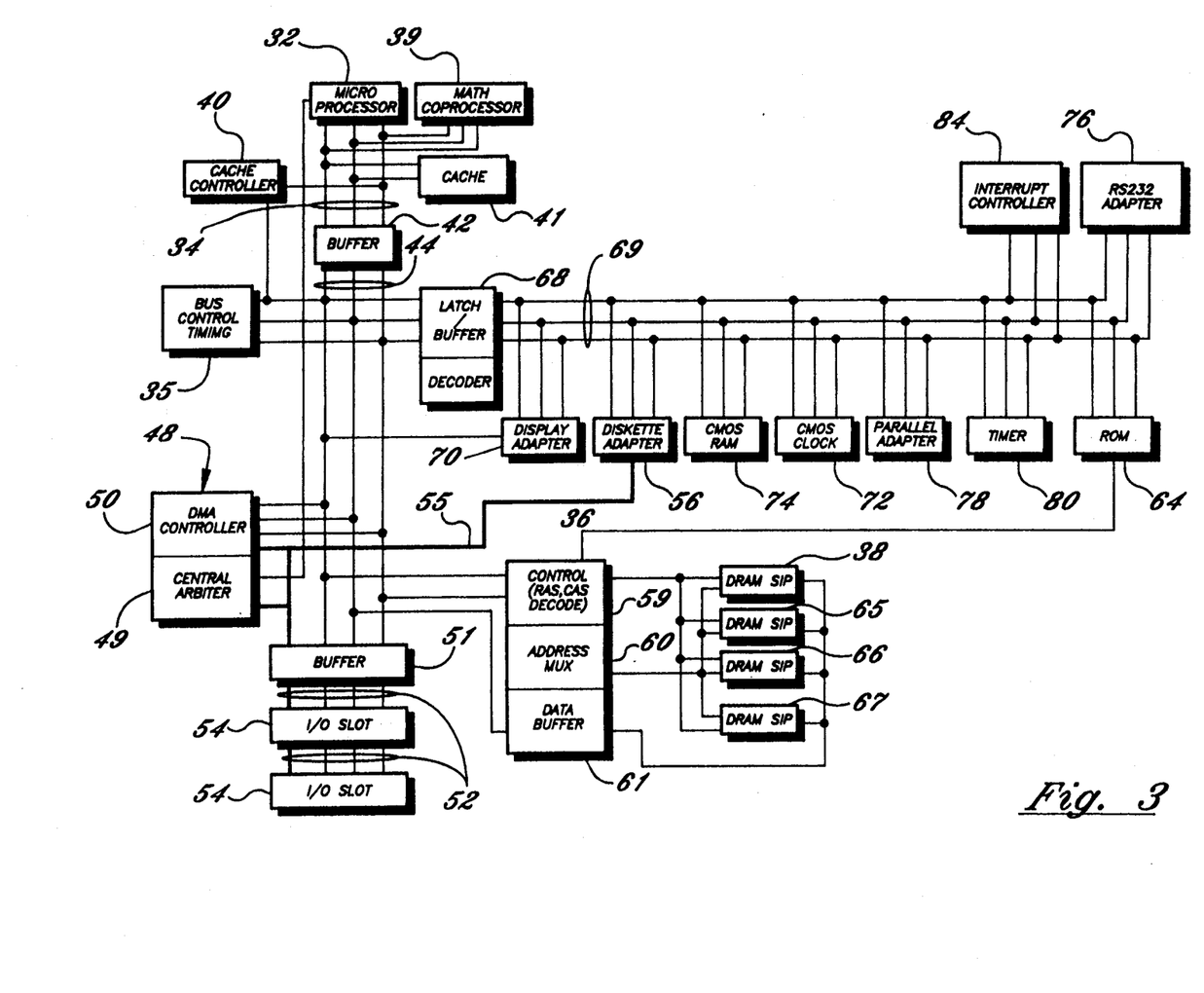
FIG. 3 is a schematic view of certain components of the personal computer of FIGS. 1 and 2.

Prior to relating the above structure to the present invention, a summary of the operation in general of the personal computer system 10 may merit review. Referring to FIG. 3, there is shown a block diagram of a personal computer system illustrating the various components of the computer system such as the system 10 in accordance with the present invention, including components mounted on the planar 20 and the connection of the planar to the I/O slots and other hardware of the personal computer system. Connected to the planar is the system processor 32 comprised of a microprocessor which is connected by a high speed CPU local bus 34 through a bus control timing unit 35 to a memory control unit 36 which is further connected to a volatile random access memory (RAM) 38. While any appropriate microprocessor can be used, one suitable microprocessor is the 80386 which is sold by INTEL.

While the present invention is described hereinafter with particular reference to the system block diagram of FIG. 3, it is to be understood at the outset of the description which follows that it is contemplated that the apparatus and methods in accordance with the present invention may be used with other hardware configurations of the planar board. For example, the system processor could be an Intel 80286 or 80486 microprocessor and the system bus could be a MICRO CHANNEL or AT type.

Returning now to FIG. 3, the CPU local bus 34 (comprising data, address and control components) provides for the connection of the microprocessor 32, a math coprocessor 39, a cache controller 40, and a cache memory 41. Also coupled on the CPU local bus 34 is a buffer 42. The buffer 42 is itself connected to a slower speed (compared to the CPU local bus) system bus 44, also comprising address, data and control components. The system bus 44 extends between the buffer 42 and a further buffer 51. The system bus 44 is further connected to a bus control and timing unit 35 and a DMA unit 48. The DMA unit 48 is comprised of a central arbitration unit 49 and DMA controller 50. The buffer 51 provides an interface between the system bus 44 and an optional feature bus such as the MICRO CHANNEL bus 52. Connected to the bus 52 are a plurality of I/O slots 54 for receiving MICRO CHANNEL option or adapter cards which may, for example, be further connected to an I/O device or memory. One specific example of an option card which forms an important portion of this invention will be described hereinafter.

An arbitration control bus 55 couples the DMA controller 50 and central arbitration unit 49 to the I/O slots 54 and a diskette adapter 56. Also connected to the system bus 44 is a memory control unit 36 which is comprised of a memory controller 59, an address multiplexor 60, and a data buffer 61. The memory control unit 36 is further connected to a random access memory as represented by the RAM module 38. The memory controller 36 includes the logic for mapping addresses to and from the microprocessor 32 to particular areas of RAM 38. This logic is used to reclaim RAM previously occupied by BIOS. Further generated by memory controller 36 is a ROM select signal (ROMSEL), that is used to enable or disable ROM 64.

While the microcomputer system 10 is shown with a basic 1 megabyte RAM module, it is understood that additional memory can be interconnected as represented in FIG. 3 by the optional memory modules 65 through 67. For purposes of illustration only, the present invention is described with reference to the basic one megabyte memory module 38.

A further buffer 68 is coupled between the system bus 44 and a planar I/O bus 69. The planar I/O bus 69 includes address, data, and control components respectively. Coupled along the planar bus 69 are a variety of I/O adapters and other components such as the display adapter 70 (which is used to drive the monitor 11), a clock 72, nonvolatile RAM 74 herein after referred to as NVRAM, a RS232 adapter 76, a parallel adapter 78, a plurality of timers 80, a diskette adapter 56, an interrupt controller 84, and a read only memory 64. The read only memory 64 includes the BIOS that is used to interface between the I/O devices and the operating system of the microprocessor 32. BIOS stored in ROM 64 can be copied into RAM 38 to decrease the execution time of BIOS. ROM 64 is further responsive (via ROMSEL signal) to memory controller 36. If ROM 64 is enabled by memory controller 36, BIOS is executed out of ROM. If ROM 64 is disabled by memory controller 36, ROM is not responsive to address enquiries from the microprocessor 32 (i.e. BIOS is executed out of RAM).

The clock 72 is used for time of day calculations and the NVRAM is used to store system configuration data. That is, the NVRAM will contain values which describe the present configuration of the system. For example, NVRAM contains information describing the capacity of a fixed disk or diskette, the type of display, the amount of memory, time, date, etc. Of particular importance, NVRAM will contain data (which can be one bit) which is used by memory controller 36 to determine whether BIOS is run out of ROM or RAM and whether to reclaim RAM intended to be used by BIOS RAM. Furthermore, these data are stored in NVRAM whenever a special configuration program, such as SET Configuration, is executed. The purpose of the SET Configuration program is to store values characterizing the configuration of the system to NVRAM.

There is also mounted within the shielded enclosure and associated with the above described components of the computer a power supply (indicated at 90 in FIG. 2) for supplying electrical power to the components of the computer 10. Preferably, and as is generally known and applied in the field of personal computers, the power supply 90 is a pulse width modulation switching power supply for connection with an alternating current electrical main supply and for supplying direct current electrical power to the data processing and storage components for enabling operation thereof. Such power supplies have been described, for example, in "The Winn Rosch Hardware Bible", published by Brady of New York under a copyright date of 1989. As there described, power supplies of the switching type are more efficient and often less expensive than their linear kind. While designs vary, the typical switching supply first converts incoming 60 Hz utility power to a much higher frequency of pulses, in the range of 20 kHz. At the same time that the electrical current is increased in frequency, it is regulated by a digital technique known as pulse width modulation. The duration of each power pulse is varied in response to the needs of the computer circuitry being supplied. The width of the pulses is controlled by electronically switching the current flow on and off, hence the name of the technique. Such switching typically occurs in a special purpose chip designed for such a function and operating with a number of other circuit elements not here shown or described. Such description is omitted here because it is believed well known to persons of ordinary skill in the relevant arts. The pulses are reduced in voltage by a transformer and turned into pure direct current by rectification and filtering.

Switching power supplies earn their efficiency and lower cost in two ways: Switching regulation is more efficient because less power is turned into heat. Instead of dissipating energy, the switching regulator switches all current flow on and off. In addition, high frequencies require smaller, less expensive transformers and filtering circuits. Nearly all of today's personal computers use switching power supplies.

In conventional switching power supplies as described immediately above, control over whether any voltage is delivered to the operating components of the computer is exercised by turning the normal utility voltage supply on and off. In the United States, such utility mains typically supply 110 volt 60 Hz alternating electrical current. The dangers to a potential user, and the safety regulations imposed by such bodies as Underwriters Laboratories, are well known to designers of personal computers.

In accordance with the invention described in and protected by the related application owned in common with this invention and mentioned at the beginning of this description, the power supply comprises a controllable component for responding to the presence and absence of a low voltage direct current electrical signal by enabling and disabling the supply of electrical power to the data processing and storage components by controlling the "on" or "off" state of the pulse width modulator, and a signal generator circuit operatively connected with the controllable component and with an alternating current electrical main supply for controllably deriving from the main supply a low voltage direct current signal for delivery to said controllable component. By reason of this interconnection, a user of the computer may control energization of the electrically powered data processing and storage components by controlling the application of a low voltage direct current signal from the signal generator circuit to the controllable component. In the illustrated embodiment, the controllable component is a pulse width modulator control circuit (described generally hereinabove and indicated at 91 in FIG. 4) which may be of conventional form such as is available from Motorola as its SG1525A/1527A series of devices. The signal generator circuit comprises several elements, including a comparator 92 and first and second signal circuits for supplying signals to the comparator.

Figure 4:
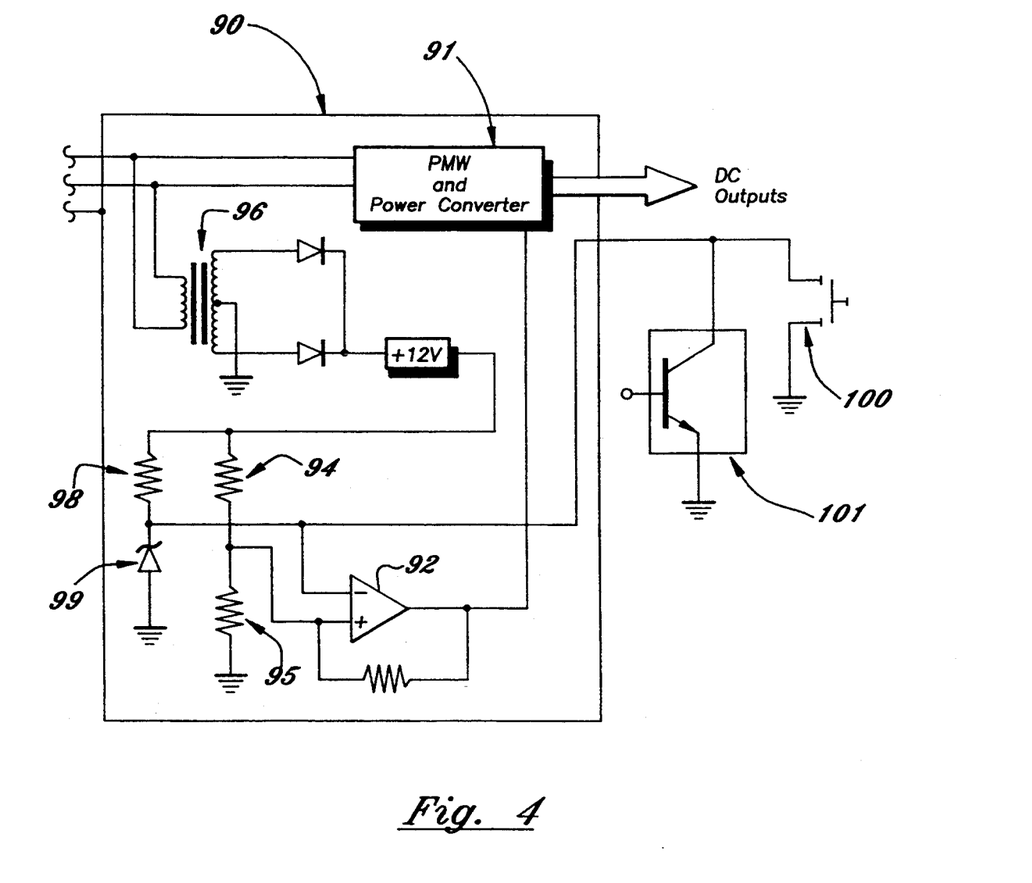
FIG. 4 is a circuit diagram of certain power supply and control elements used in the computer of FIGS. 1 through 3.

The comparator 92 receives from a first signal circuit a low voltage direct current reference signal established by a voltage divider 94, 95 supplied with rectified current transformed from the main supply voltage by a suitable small transformer 96. The comparator 92 also receives a controlled low voltage enable/disable signal varying between a first voltage and a second, higher voltage. The enable/disable signal is established by a regulated voltage divider formed by a resistor 98 and an associated zener diode 99, to which is connected a current drain in the form of a switch device for grounding out the point of connection between the resistor and diode. The switch device, which functions at a low, logic level voltage (typically 5 volts) as distinguished from the voltage of the main supply (typically on the order of 100 volts or more), may be in the form of a manually operable switch 100 or a computer logic operable switch 101. In either instance, operation of the switch 100 or 101 functions for selecting between the first and second voltages for the enable/disable signal. Responding to the change in voltage of signals applied, the comparator 92 either delivers a signal forward to a shutdown or inhibit pin of the control circuit 91 or does not deliver a signal and thereby controls the power delivered to the electrically powered data processing and storage components of the computer.

It is to be noted that the control occurs on the secondary, or output, side of the primary power transformer of the power supply, where the pulse width modulator component is connected, so that a user is isolated from dangerous voltages.

As will be appreciated, a user of the computer 10 may control the power on power off functions by manipulating the manual switch 100, and thereby use the computer while avoiding exposure to the higher voltages and currents typically supplied through the main electrical supply obtained from a power distribution company or utility.

The present invention contemplates that the computer 10 may be activated to a power-on state, perform as a network server, and be restored to a deactivated, dormant power-off state all while unattended by an operator. This is accomplished through the provision of an network option card mounted in one of the MICRO CHANNEL connectors or slots 54 as will now be described.

Figure 5:
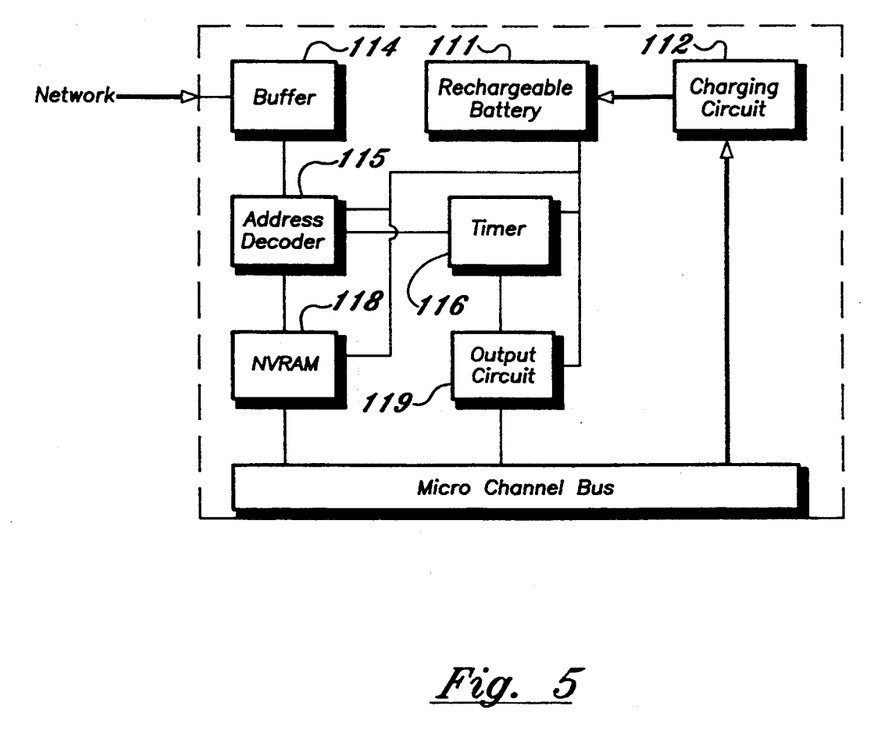
FIG. 5 is a schematic representation of a network option card as incorporated in a network server personal computer of the type generally shown in FIGS. 1 through 3.

FIG. 5 illustrates a form of network option card 110 particularly designed for use with a MICRO CHANNEL personal computer. However, knowledgeable readers will understand from the description which here follows that the invention may also be embodied in option cards usable with the Family I or AT bus architecture or, for that matter, with still other types of computers used as network servers. Network option cards are available to adapt a personal computer to a number of differing network schemes, including those known as Token Ring, Ethernet, and Token Bus. While the present invention will be here disclosed with particular reference to an Ethernet adapter or option card, it will be understood that the principles here described can be adapted to various network schemes and thus are not to be understood as being restricted to only one scheme.

The option card 110, in a preferred form, bears a rechargeable battery 111 of suitable type such as a nickel-cadmium battery, and an associated charging circuit 112 for maintaining a proper state of charge in the battery. The battery 111 provides power for the operation of an input buffer 114 and address decoder 115 (as may be conventionally supplied on a network option card) during intervals when the associated server system 10 os dormant. The battery 111 also provides power to an inactivity timer 116, NVRAM memory elements 118 and an output circuit 119 which is connected by an appropriate means with the logic operated switch 101 of the power supply of FIG. 3. The output circuit may be connected, by way of example, by an appropriate cable bypassing the I/O bus of the server system 10 (which would be unavailable during dormancy of the system). In the event that the power supply of the computer 10 is provided with a portion which maintains the availability of a suitable logic level voltage even while the computer is "off", then the battery 111 may be dispensed with and the NVRAM replaced by any suitable RAM devices powered from the power supply.

In a typical installation as contemplated by this invention, the option card 110 may be mounted in any available slot 54 in the computer 10. The output circuit 119 of the card 110 is appropriately connected with the logic level switch 101 of the power supply so as to be put into parallel with the manual switch 100 so that the computer 10 may be activated or powered up by either an operator manipulating the manual switch or by the operation of the option card 110 as will be described. As will be understood, the mounting of the option card 110 in the slot 54 will provide an operative connection with other components of the computer 10 effective to provide charging current for the charging circuit 112 and to provide communication over the bus for program operation.

In an Ethernet network, data is moved in "datagrams", a self contained packet, independent of other packets, that carries information sufficient for routing from the originating data terminal equipment (DTE, usually a lan station personal computer in the environment particularly contemplated by this invention) to the destination DTE without relying on earlier exchanges between the DTEs and the network. In the environment particularly contemplated by this invention, the delivery of a datagram to the dormant server is recognized by the address decoder 115 which functions as an event tracking element for registering the occurrence of that event, namely the datagram delivery. The address decoder 115 passes the datagram to the NVRAM memory elements 118 to be held there pending activation of the server system 10 and also activates the timer 116 and output circuit 119. When activated, the timer 116 begins to time the interval of permitted operation for the server system 10, and the output circuit 119 cooperates with the system power supply 90 to activate, power-on or "wake-up" the server system 10. As the server system awakes, the datagram stored in the NVRAM 118 on the card is delivered and the requested exchange or access begins. For so long as datagrams continue to pass through the card 110 which include the server address, the address decoder 115 will continue to reset the timer 116 and maintain activation of the server system. At the end of the predetermined time interval after the passage of the last such datagram, the timer 116 "times out" and the server system 10 is deactivated, powered down, and rendered dormant. The interval timed by the timer 116 may be set by software or manually by switches provided on the card 110. Setting the time interval to zero will effectively disable the present invention and permit operation with a network option card in accordance with this invention in a manner as if the feature of this invention was absent.

It should be noted that the present invention will be essentially transparent to a client user on a network operated in accordance with this invention. That is, beyond any potential delay in the server system 10 booting up and responding to the client request which functions as a "wake-up call", the user of a client personal computer will be unaware that the server has been dormant or returns to dormancy after use, even with that server system being unattended.

While this invention has been here disclosed as embodied in an option card to be added to a more general purpose computer in adapting the computer to use as a network server, the knowledgeable reader will recognize that the invention may, where desired, be incorporated in the planar or motherboard of a computer and thereby provided as an available function absent the need of any option or adapter card or board.

In the drawings and specifications there has been set forth a preferred embodiment of the invention and, although specific terms are used, the description thus given uses terminology in a generic and descriptive sense only and not for purposes of limitation.

What is claimed is:

1. A local area network server microcomputer comprising:
   electrically powered data processing and storage components for processing and storing digital data,
   a data signal transferring bus including at least one option card receiving slot for establishing communication between an option card removably mounted in said slot and said data processing and storage components,
   a power supply for connection with an alternating current electrical main supply and for supplying direct current electrical power to said data processing and storage components for enabling operation thereof, said power supply comprising
   (a) a signal generator circuit operatively connected with a controllable component and with said alternating current electrical main supply for controllably deriving from the main supply a low voltage direct current signal for delivery to the controllable component and
   (b) said controllable component for responding to presence and absence of the low voltage direct current electrical signal by enabling and disabling supply of electrical power to said data processing and storage components, and
   a network option card mounted in said slot and operatively coupled to said controllable component for activating and deactivating the microcomputer and for directing functioning of the microcomputer upon activation by said network option card, said network option card comprising:
   memory elements for storing information regarding
   (d) an event on which the microcomputer is to be activated and
   (e) functions to be performed by the microcomputer while activated,
   an event tracking element for registering occurrence of said event, and
   an activation controlling element operatively coupled with said memory elements and said tracking element for identifying an event on which the microcomputer is to be activated, and activating the microcomputer.

2. A microcomputer according to claim 1 wherein said event tracking element is an address decoder.

3. A microcomputer according to claim 1 wherein said option card further comprises a card power source functioning independently of said power supply for supplying operating power for said memory elements, said event tracking element and said activation controlling element during dormancy of said microcomputer.

4. A microcomputer according to claim 1 wherein said option card further comprises an inactivity timer for timing an interval of inactivity during which signal exchange between the server microcomputer and the network are absent and operatively associated with said activation controlling element for deactivating the microcomputer upon the occurrence of a predetermined interval of inactivity.

5. A microcomputer according to claim 1 wherein said memory elements receive and store requests for client service and further wherein said memory elements transfer stored requests to said data processing and storage components upon activation of said microcomputer.

6. A local area network server microcomputer comprising:
   electrically powered data processing and storage components for processing and storing digital data,
   a data signal transferring bus including at least one option card receiving slot for establishing communication between an option card removably mounted in said slot and said data processing and storage components,
   a power supply for connection with an alternating current electrical main supply and for supplying direct current electrical power to said data processing and storage components for enabling operation thereof, said power supply comprising
   (a) a signal generator circuit operatively connected with a controllable component and with said alternating current electrical main supply for controllably deriving from the main supply a low voltage direct current signal for delivery to the controllable component and
   (b) said controllable component for responding to presence and absence of the low voltage direct current electrical signal by enabling and disabling supply of electrical power to said data processing and storage components, and
   a network option card mounted in said slot and operatively coupled to said controllable component for activating and deactivating the microcomputer and for directing functioning of the microcomputer upon activation by said network option card, said network option card comprising:
   memory elements for storing a datagram received from the network requesting service from the server microcomputer,
   an address decoder for recognizing the receipt from the network of said datagram addressing the server microcomputer,
   an activation controlling element operatively coupled with said memory elements and said address decoder for identifying the receipt of said datagram addressing the server microcomputer and activating the microcomputer, and
   a card power source functioning independently of said power supply for supplying operating power for said memory elements, said address decoder and said activation controlling element during dormancy of said microcomputer.

7. A personal computer system having a high speed system processor compatible with application programs and operating system software designed to execute on slower speed system processors, said personal computer system comprising:
   a high speed microprocessor having a real and protected mode of operation coupled to a high speed data bus;
   a data signal transferring bus including at least one option card receiving slot for establishing communication between an option card removably mounted in said slot and said high speed microprocessor;
   non-volatile memory electrically coupled to said data signal transferring bus;
   a bus controller for providing communications between the high speed data bus and said data signal transferring bus;

volatile memory electrically responsive to the high speed data bus;

a memory controller electrically coupled to said volatile memory and said non-volatile memory, said memory controller regulating communications between said volatile memory and said high speed microprocessor; and a power supply for connection with an alternating current electrical main supply and for supplying direct current electrical power to said data processing and storage components for enabling operation thereof, said power supply comprising (a) a signal generator circuit operatively connected with a controllable component and with said alternating current electrical main supply for controllably deriving from the main supply a low voltage direct current signal for delivery to the controllable component and (b) said controllable component for responding to presence and absence of the low voltage direct current electrical signal by enabling and disabling supply of electrical power to said data processing and storage components, and a network option card mounted in said slot and operatively coupled to said controllable component for activating and deactivating the microcomputer and for directing functioning of the microcomputer upon activation by said network option card, said network option card comprising:

memory elements for storing information regarding (d) an event on which the microcomputer is to be activated and (e) functions to be performed by the microcomputer while activated, an event tracking element for registering the occurrence of said event, and an activation controlling element operatively coupled with said memory elements and said tracking element for identifying the event on which the microcomputer is to be activated, and activating the microcomputer.

8. A personal computer system having a high speed system processor compatible with application programs and operating system software designed to execute on slower speed system processors, said personal computer system comprising:

a high speed microprocessor having a real and protected mode of operation coupled to a high speed data bus;

a data signal transferring bus including at least one option card receiving slot for establishing communication between an option card removably mounted in said slot and said high speed microprocessor;

non-volatile memory electrically coupled to said data signal transferring bus;

a bus controller for providing communications between the high speed data bus and said data signal transferring bus;

volatile memory electrically responsive to the high speed data bus;

a memory controller electrically coupled to said volatile memory and said non-volatile memory, said memory controller regulating communications between said volatile memory and said high speed microprocessor; and a power supply for connection with an alternating current electrical main supply and for supplying direct current electrical power to said data processing and storage components for enabling operation thereof, said power supply comprising (a) a signal generator circuit operatively connected with a controllable component and with said alternating current electrical main supply for controllably deriving from the main supply a low voltage direct current signal for delivery to the controllable component and (b) said controllable component for responding to presence and absence of the low voltage direct current electrical signal by enabling and disabling supply of electrical power to said data processing and storage components, and a network option card mounted in said slot and operatively coupled to said controllable component for activating and deactivating the microcomputer and for directing functioning of the microcomputer upon activation by said network option card, said network option card comprising:

memory elements for storing a datagram received from the network requesting service from the server microcomputer, an address decoder for recognizing the receipt from the network of said datagram addressing the server microcomputer, an activation controlling element operatively coupled with said memory elements and said address decoder for identifying the receipt of said datagram addressing the server microcomputer and activating the microcomputer, and a card power source functioning independently of said power supply for supplying operating power for said memory elements, said address decoder and said activation controlling element during dormancy of said microcomputer.

* * * * *